May 2, 1944.  L. B. WINTON  2,347,860

LIQUID LEVEL INDICATING SYSTEM

Filed Sept. 30, 1942

Inventor:
Lewis B. Winton,

Patented May 2, 1944

2,347,860

UNITED STATES PATENT OFFICE 2,347,860

LIQUID LEVEL INDICATING SYSTEM

Lewis B. Winton, Greenwich, Conn., assignor to Philip A. Jerguson, Medford, Mass.

Application September 30, 1942, Serial No. 460,216

7 Claims. (Cl. 73—299)

This invention relates to liquid level indicating systems, particularly for boilers and like pressure containers, of the type wherein the level of liquid in a container is manifested by a differential manometer exterior to the container, which manometer may be located at a convenient remote point.

One object of the invention is to provide a simple and effective device of this nature, readily put in service and conveniently checked for accuracy during operation. A coordinate object is to provide a simple and effective device whereby, in the case of a boiler for example, errors due to the fact that the temperature within the container is different from that at the manometer are avoided. Still another coordinate object is to provide a simple and efficient device effective for systems which are subject to angular displacement as a whole during use, such as are exemplified by a marine boiler when the ship rolls or pitches, and whereby there is avoided objectionable disturbance of the indication of the manometer due to such displacement.

My invention will be well understood by reference to the following description of the illustrative embodiment thereof effective to accomplish all the above recited objects shown by way of example in the accompanying drawing, wherein:

Fig. 5 is a diagram to be referred to.

Figure 1:
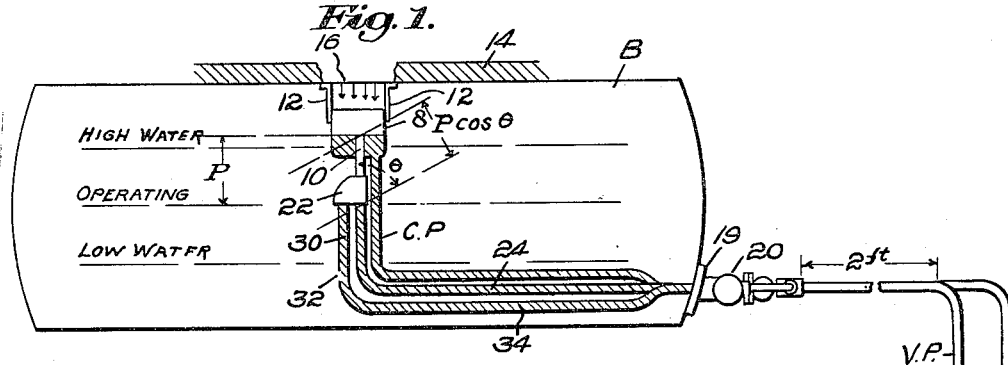
Fig. 1 is a diagram in the nature of a vertical section or elevation showing a boiler and manometer, the proportions of the various parts being, of course, entirely unrealistic.
Figure 2:
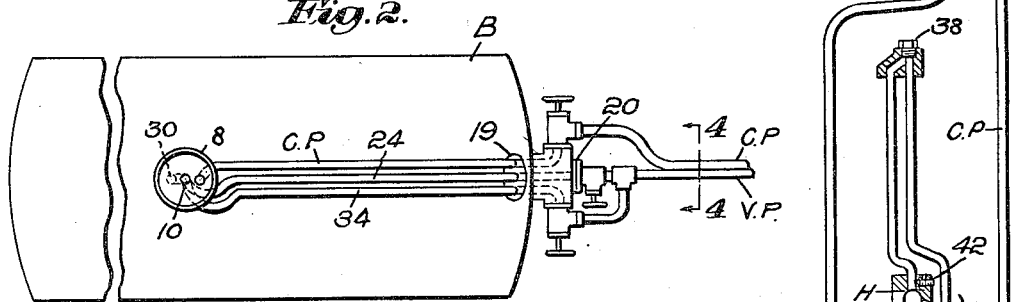
Fig. 2 is a diagram corresponding to a plan section of the boiler.

Referring to Figs. 1 and 2, I have there shown at B in diagrammatic fashion the upper drum of a marine boiler, the liquid level therein being indicated by a remote differential manometer M, herein shown as a hydrostatic manometer of the inverted U-tube type utilizing a manometric fluid lighter than water, provision being made for observing the position of the surface of one of the columns of fluid in the U as by constructing a portion G of this leg thereof in a manner similar to those gage glasses commonly used for high pressure work and with a transparent pane or window behind which the surface to be observed moves.

The right-hand side of the manometer, viewing Fig. 1, is in communication with a datum chamber 8, preferably located within the boiler shell and for reasons which will appear at the center line thereof, which cup is adapted to be replenished with liquid and is provided with an overflow 10 for the establishment therein of a fixed liquid level somewhat higher than the normal "high" water level of the boiler. The other side of the manometer is connected to the water-containing spaces of the drum below the normal "low" water level therein to receive the pressure of a head of water which varies as the actual depth of water in the drum varies. The difference between this actual level and the level established in the chamber 8 measures the water level. The connection from the datum chamber 8 is marked "C. P." on the drawing, indicative of the expression "constant pressure," and the connection to the water-containing space of the boiler is marked "V. P." indicative of the expression "variable pressure," the portion within the boiler shell bearing the numeral 34.

The variable pressure pipe V. P. is preferably connected to that side of the U-tube wherein the gage G is placed so that the surface of the column of water supporting the manometric liquid behind the glass of the gage is observed to rise as the liquid level in the boiler rises. Preferably the length of the glass is such that the water disappears at the lower end thereof at normal low water level in the boiler, as indicated by the mark L thereon, and disappears at the upper end thereof at the normal high water level in the boiler, as indicated by the mark H thereon, while the normal operating level indicated by the letter N is substantially midway of the glass.

Figure 3:
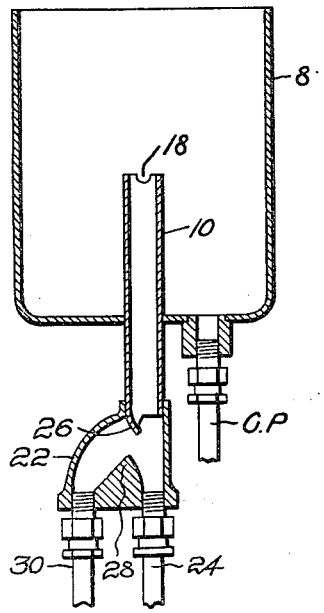
Fig. 3 is a vertical section of a datum chamber or cup such as may be utilized in the system.

The datum chamber 8, as best shown in Figs. 1 and 3, may take the form of a cup located in the boiler as high as possible and as near as practicable to the center of the boiler both lengthwise and transversely of the latter, its center line and that of the boiler preferably coinciding. In Fig. 1 it is shown as hung by straps 12 from the top of the boiler shell. It is replenished with water in any suitable manner, this being here indicated by showing a portion of the boiler covering 14 immediately above the same as cut away to expose a bare spot of the boiler to promote condensation, the condensate dripping into the open top of the cup. Centrally of the cup the overflow pipe 10 projects upwardly therein, its upper end being notched across at 18 in a single plane, the bottom of the notches establishing a fixed level in the cup slightly above the normal high water mark of the boiler. From the bottom of the cup the C. P. connection is taken by a suitable pipe which, as shown in Fig. 1, preferably depends vertically beneath the cup to a point below low water mark and thence leads in any convenient manner from the boiler, preferably through a fitting 19 located at a point in the vertical diameter of the drum end and connected with an exterior manifold 20 and thence to the manometer M.

The lower depending end of the overflow pipe 10 is here shown as opening to a fitting 22 in the nature of an inverted Y fitting. From one of the downwardly directed branches of the fitting 22 leads an auxiliary tube or pipe 24 leading to the manifold 20 preferably, for reasons which will appear, by a run extending vertically downward below the normal water level and hence horizontally to the manifold and to this pipe 24 the overflow pipe 10 discharges. There is herein shown a lip 26 at the bottom end of the pipe 10 to direct the liquid to the pipe 24 and the wall 28 between the two branches of the fitting 22 is suitably shaped, as indicated in Fig. 3, to cooperate therewith. The upper edge of this wall forms a weir from which water from pipe 24 may in turn overflow to be discharged through the other outlet of the fitting to a vertical pipe 30 which extends below the low water level on the boiler where it is provided with a port 32 (Fig. 1) opening to the main body of water in the drum. Herein this pipe 30 is continued by branch 34 which forms a part of the variable pressure line passing through fitting 19 to the manifold 20, whence the line continues to the variable pressure side of the manometer, the port 32, which it will be noted is vertically below the cup 8, providing for transmitting to the manometer the variable head due to the liquid content of the boiler.

At the manifold separable valves control the pipes C. P., V. P. and 24, and herein the auxiliary pipe 24 is merged outwardly of these valves with the V. P. pipe leading to the manometer, the valves permitting the alternative connection of the pipe 34 and the pipe 24 to the variable pressure side of the manometer.

While herein I have shown the auxiliary pipe 24 and the interior portion 34 of the variable pressure pipe as connected to and depending from the cup 8, the vertical portion of the auxiliary pipe is essentially a standpipe maintained constantly full to the level of the top of the partition 28 which is located, as indicated in Fig. 1, at a suitable level between "high" water mark in the boiler and "operating" water level.

Figure 4:
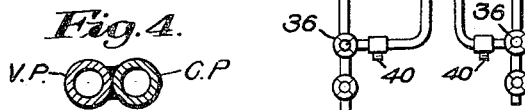
Fig. 4 is an enlarged section on the line 4—4 of Fig. 2.

The V. P. and C. P. pipes outwardly of the manifold are extended substantially horizontally for a suitable distance, which may be about two feet, as indicated by the dimensional marking of Fig. 1, to permit the water therein to come to room temperature without alteration of head. The pipes likewise may be joined side by side in intimate heat-transmitting contact, as illustrated in Fig. 4, to permit rapid equalization of temperature. The purpose of these expedients is to prevent the transfer of relatively hotter or cooler water (and consequently lighter or heavier water) from one part of the system to the other due, for example, to inclination of the system from affecting the heads to falsify the reading of the manometer.

At this place it is convenient to note that as to those parts located within the boiler shell as herein described, the portions of the variable pressure and constant pressure columns as well as the column in the auxiliary pipe 24 are all at boiler temperature and pressure. The manometer and its piping beyond the horizontal branches referred to are at room temperature. The transition from one to the other is effected without change of head. By these means the effect of temperature changes on the indications of the manometer is minimized.

To prepare the instrument for use it is filled with water through filling plug 38 at the top of the gage or otherwise. The valves 36 being closed, water is then drawn through the plugs 40 in substantially equal amounts from each leg until the level is observed in the glass, preferably at a point below C therein. The manometric liquid is then supplied through the plug 38 until it overflows and plug 38 is then replaced.

The valve at manifold 20 leading to pipe 34 is closed and the valves leading to pipe 24 and to the cup 8 opened, shut-offs 36 are opened and a fixed differential pressure is thus applied to the manometer corresponding to the difference between the known heights of the top of the overflow tube 10 and the top of the partition 28 determining the overflow point of the tube 24. The gage will read below checking point C thereon because excess manometric liquid has been added and the excess may be drawn off through a bleeding valve 42 at the top of the gage between the "high" level and the equalizing level (where the manometric liquid stands at the same height in each leg) until the indication stands at the mark C determinately located between the high and normal marks of the gage proportionately to the location of the overflow point at 28 between the "high" and "operating" levels of the boiler. The valve to the checking tube 24 is then closed, the valve to the pipe 34 opened and the apparatus is in operation.

The manometer may be checked at any time under the temperature and pressure conditions of the boiler by shutting off the connection to the pipe 34 and opening that to the pipe 24 when the indication should come to the C mark at the edge.

In the construction shown, surging of water in the boiler due to inclination of the system will not substantially affect the levels within the boiler which are effective on the mechanism. Theoretically the level at the center line of the boiler does not change if the system is inclined. While for various reasons the level at the center line is not a flat surface, it is as near constant for a given quantity of liquid in the system as may be chosen. The level of the liquid in the cup 8, which is at least approximately concentric with the boiler, similarly does not change. The top of the auxiliary tube 24 on substantially the same vertical center line also determines a checking level independent of any inclination of the ship. The port 32 of the extension 34 of the variable pressure tube is below "low" water at the center line where it will not be uncovered by the water moving away from it on surging. It will be noted also that if the boiler is emptied for any reason, the pipe 34 with its port 32 forms a trap for a column of water of a height slightly less than that of normal "low" water and undue unbalanced pressure on the manometer is thus prevented.

To accurately indicate the changes of level as measured by an apparatus, desirably internal to the boiler as shown, which remains as nearly as may be undisturbed by surging in so far as the levels go, a manometer should be utilized, the construction of which will substantially inhibit objectionable disturbances due to the surging of the manometric liquid as the system is inclined. In the hydrostatic manometer shown this is effected by making that part of the variable pressure leg in which the surface of the liquid moves within the range of the instrument, corresponding to the gage G, coaxial with that part of the C. P. leg in which the surface of the other column moves.

Figure 5:
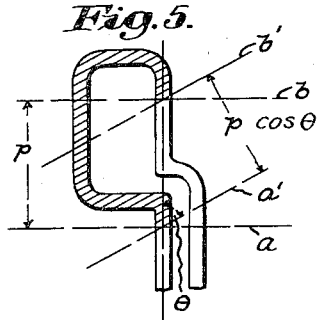

Referring to the diagram (Fig. 5) I have there shown an inverted U-tube constructed in this manner and containing manometric liquid subject to an unbalanced pressure. The liquid in the low pressure leg, herein the variable pressure, is standing at the line $a$ and that in the high pressure leg, herein the constant pressure, standing at the line $b$. The heads in the system above the line $b$ and below the line $a$ are balanced. In the left-hand leg we have a pressure due to a column of manometric liquid of height $p$ and in the right-hand leg a pressure due to a column of water of height $p$. If the system is now inclined through an angle $\theta$, the lines $a$ and $b$ take the positions $a'$ and $b'$. Heads below and above $a'$ and $b'$ are balanced as before and the effective head in each leg is modified by the factor $\cos \theta$ so that there is no tendency toward surging of the liquid.

Referring now to Fig. 1, lines have been drawn therein at an angle $\theta$ through the center line of the boiler at the top of the overflow pipe 10 and at the normal water line of the boiler, which latter may here be taken as representing any water level within the range of the instrument. When the system tips so that these lines are horizontal, the actual levels at the center line remain the same, but the head P is modified by the factor $\cos \theta$. As the heads at the manometer are modified by the same factor, the indication of the manometer does not change on inclination of the system.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. In a water level indicating system for containers, a cup within the container arranged to be replenished with liquid and having an overflow conduit leading from a point above normal liquid levels in the container to below normal water levels of the container, said conduit itself having an overflow port at an elevation between normal high and low levels, a differential manometer, one side of which is in communication with the cup and the other side of which has connections to said overflow conduit and also to the water-containing spaces of the container, at a point at least as low as the normal low level thereof, and valve means for controlling said latter connections to provide for alternative use thereof.

2. In a water level indicating system for containers, a cup within the container arranged to be replenished with liquid and having an overflow conduit leading from a point above normal liquid levels in the container to below normal liquid levels of the container, said conduit itself having a pipe opening therefrom at an elevation between normal high and low levels, said pipe having a port below the normal low water level, a differential manometer, one side of which is in communication with the cup and the other side of which has connections for placing it in communication both with said pipe and with said conduit at a point below the point of opening of the pipe, and valve means for controlling said latter connections providing for alternative use thereof.

3. In a liquid level indicating system for containers, a cup within the container extending above the normal high water level therein and arranged to be replenished with liquid, a high pressure pipe depending from the cup, an overflow pipe projecting above the bottom of the cup to a point above normal liquid levels therein and thence below the bottom, an inverted Y fitting on the lower end of the overflow pipe, an auxiliary pipe from one branch of the Y to which the overflow pipe primarily discharges, a low pressure pipe leading from the other branch of the Y and having a port to the water-containing space of the container at least as low as normal low level, a differential manometer to one side of which the high pressure pipe is connected and to the other side of which the auxiliary and low pressure pipes are connected, and valve means controlling the latter two pipes to provide for alternative use thereof.

4. In a liquid level indicating device for containers, a cup within the container disposed substantially centrally thereof as regards both length and breadth thereof, extending above the normal high water level of the container and arranged to be replenished with liquid, a high pressure pipe depending from the cup, an overflow pipe opening in said cup at a point above normal liquid levels in the container, a standpipe to which the overflow pipe discharges having an overflow at an elevation between the "normal" operating level and the "high" level of the container, the high pressure pipe and the standpipe extending vertically downward beneath the cup to a point below normal "low" level, a low pressure pipe having an opening to the liquid-containing space of the container at a point below normal low level, a differential manometer to one side of which the high pressure pipe is connected and to the other side of which the standpipe and the low pressure pipe are connected, and valve means controlling the latter two pipes to provide for alternative use thereof.

5. In a liquid level indicating device for containers, a cup within the container disposed substantially centrally thereof as regards both length and breadth thereof, extending above the normal high water level of the container and arranged to be replenished with liquid, a high pressure pipe depending from the cup, an overflow pipe opening in said cup at a point above normal liquid levels in the container, a standpipe to which the overflow pipe discharges having an overflow at an elevation between the "normal" operating level and the "high" level of the container, the high pressure pipe and the standpipe extending vertically downward beneath the cup to a point below normal "low" level, a low pressure pipe having an opening to the liquid-containing space of the container at a point below normal low level and vertically below the cup, a differential manometer to one side of which the high pressure pipe is connected and to the other side of which the stand pipe and the low pressure pipe are connected, and valve means controlling the latter two pipes to provide for alternative use thereof.

6. In a liquid level indicating system for containers, a cup replenished with the liquid and having overflow means to establish therein a fixed head under the pressure of the container, a hydrostatic differential manometer comprising communicating chambers receiving confluent columns of manometric liquid, means connecting said chambers to the liquid-containing spaces of the container and to said cup respectively to apply the heads in the container as such and in said cup to said columns respectively, the cup being located substantially at the vertical center line of the container and the vertical center lines of the columns at least in those parts thereof wherein the columnar surfaces move in the normal operating range of the manometer being substantially coincident, whereby objectionable disturbance of the indication resultant from surging of water in the container and of the manometric liquid is in substantial measure inhibited.

7. In a liquid level indicating device for boilers and the like, a cup within the boiler arranged to be replenished with water, an overflow opening from said cup to mantain a constant level therein, a constant pressure pipe leading from the cup, a variable pressure pipe opening from the water-containing space of the boiler, an exterior differential manometer to the sides of which said pipes are connected, which pipes as they leave the boiler shell have substantially horizontal reaches of extended length to permit the liquid therein to reach room temperature.

LEWIS B. WINTON.